United States Patent [19]

Turnbull

[11] 4,163,716
[45] Aug. 7, 1979

[54] PROCESS FOR THE PURIFICATION OF CONTAMINATED WATER

[75] Inventor: Roy H. Turnbull, Westville, South Africa

[73] Assignee: Feltex Limited, South Africa

[21] Appl. No.: 839,352

[22] Filed: Oct. 4, 1977

Related U.S. Application Data

[63] Continuation of Ser. No. 655,849, Feb. 6, 1976, abandoned, which is a continuation-in-part of Ser. No. 516,496, Oct. 21, 1974, abandoned.

[30] Foreign Application Priority Data

Oct. 22, 1973 [ZA] South Africa ...................... 73/8172

[51] Int. Cl.² ........................... C02B 1/16; C02B 1/20
[52] U.S. Cl. ..................................... 210/28; 204/149; 210/37 R; 210/38 R; 210/47; 210/50; 210/60; 210/96.1
[58] Field of Search .................. 204/149, 152; 210/24, 210/28, 30, 37 R, 38 R, 45, 42 R, 47, 50-53, 60, 96 R

[56] References Cited

U.S. PATENT DOCUMENTS

| | | | |
|---|---|---|---|
| 2,667,454 | 1/1954 | Roller | 204/149 |
| 3,419,493 | 12/1968 | Pangle | 210/44 |
| 3,531,463 | 9/1970 | Gustafson | 210/30 |
| 3,617,559 | 11/1971 | Cywin | 210/50 |
| 3,677,940 | 7/1972 | Fujimoto et al. | 210/44 |
| 3,803,030 | 4/1974 | Montanaro et al. | 210/32 |
| 3,853,758 | 12/1974 | Hurwitz et al. | 201/37 |
| 3,915,820 | 10/1975 | Ito et al. | 204/152 |

FOREIGN PATENT DOCUMENTS 1177081 8/1964 Fed. Rep. of Germany ........... 204/149
4520352 6/1965 Japan ........................................ 210/24

OTHER PUBLICATIONS

Porges, R. et al., *Sewage Works Journal*, "Chemical Precipitation of Textile Waste," pp. 828–863, 1939.

*Primary Examiner*—Charles N. Hart
*Assistant Examiner*—Peter A. Hruskoci
*Attorney, Agent, or Firm*—Pennie & Edmonds

[57] ABSTRACT

The invention concerns a process for the purification of acid dyehouse effluent from a dyeing process, which is contaminated with coloured substances and heavy metal ions. After removal of fibers, the effluent is subjected to ion exchange to remove surface active agents and is then subjected to electrolysis with an iron cathode. Ferrous and ferric hydroxide is formed and the ferrous and ferric hydroxide together with the colored substances and heavy metal ions are removed from the effluent liquid. The liquid which remains is recycled to the dyehouse.

7 Claims, 1 Drawing Figure

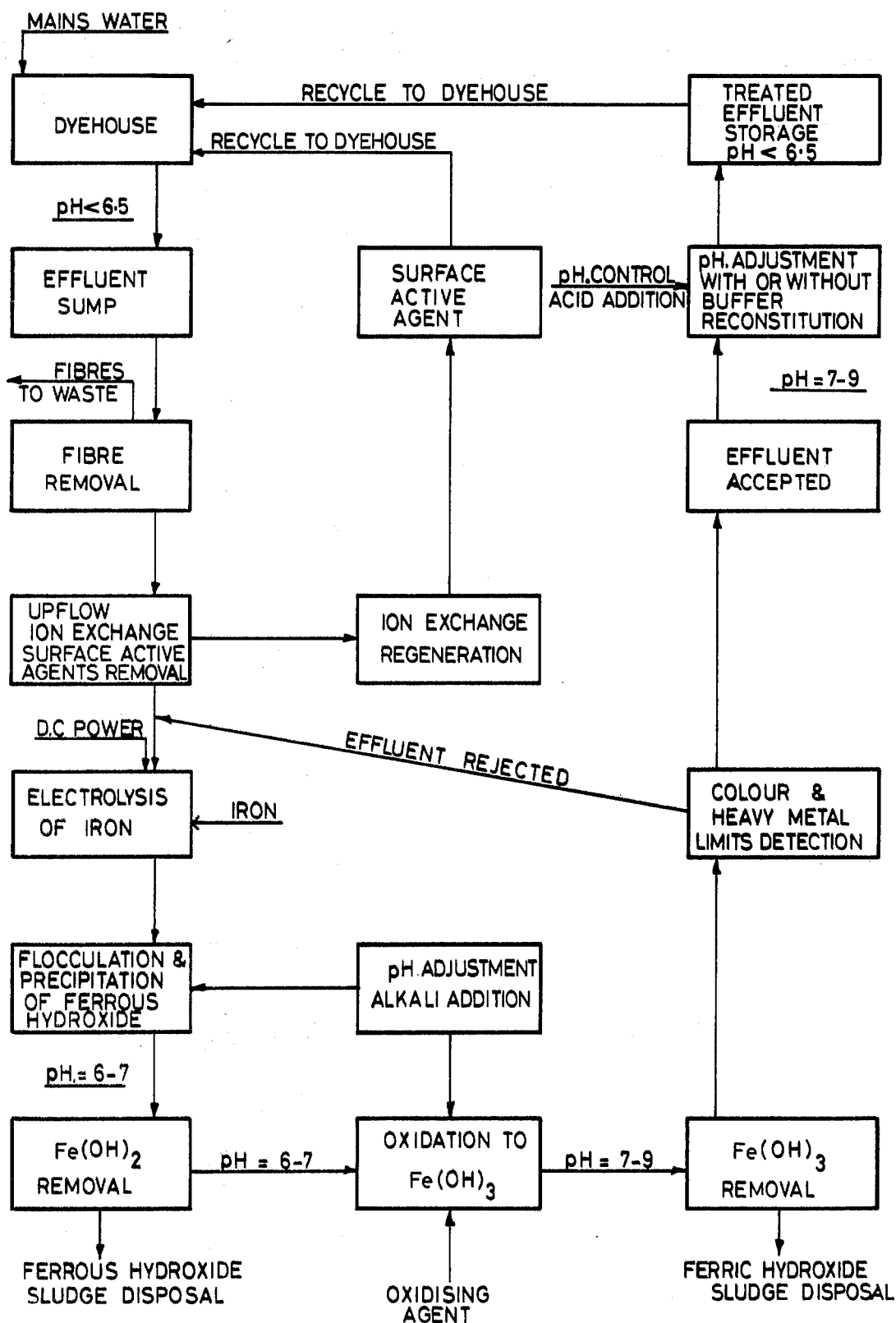

PROCESS FOR THE PURIFICATION OF CONTAMINATED WATER

CROSS REFERENCE TO RELATED APPLICATIONS

This application is a continuation of application Ser. No. 655,849 filed Feb. 6, 1977, now abandoned, which application Ser. No. 655,849 was in turn a continuation-in-part of application Ser. No. 516,496 filed Oct. 21, 1974, now abandoned.

BACKGROUND TO THE INVENTION

1. Field of the Invention

The invention relates to a process for the purification of waste water, referred to as effluent, from dyeing processes.

2. Description of the Prior Art

It has been proposed in U.S. Pat. No. 3,677,940 to add a coagulant comprising heavy metal ions to dyehouse effluent, to form metallic hydroxide therefrom and to remove the metallic hydroxide floc. Similarly in Japenese patent specification No. 45-2052, the addition of ferrous sulphate to waste water is suggested to remove the colour therefrom. U.S. Pat. No. 3,419,493 discloses a process where calcium ions are added. In all these processes, there is a build up of heavy metal ions in the resultant liquid. This is disadvantageous if the liquid is to be recycled to the dyehouse.

German Auslegeschrift No. 1,177,081 discloses a process for the removal of colloidal substances by electrolysis in the presence of wetting agents, using an iron electrode. When conducting experiments according to the description of that German Auslegeschrift, I have found that the solution itself is electrolysed, is electroflotation takes place with the formation of very small bubbles which float off the wetting agent. Thus, the presence of the wetting agent is essential.

OBJECTS OF THE INVENTION

It is an object of the invention to provide a process for the purification of effluent from a dyehouse and in which process useful surface active agents are recovered, and the content of heavy metal ions is not built up substantially, so that the purified liquid can be recycled to the dyehouse.

SUMMARY OF THE INVENTION

The present invention provides a process for the purification of acid effluent from a dyehouse without substantially building up the total dissolved solids content in the effluent, said effluent being effluent of pH less than 6.5 from a dying process and which is contaminated with at least one dye, heavy metal ions and surface active agents, but substantially free from fibres, which process comprises the steps of (i) subjecting the acid effluent to upflow ion-exchange to remove surface active agents present;
(ii) introducing iron ions into the liquid obtained by subjecting it to electrolysis using an iron electrode
(iii) if the pH of the liquid is below 6, adding alkali to adjust the pH to within the range 6 to 7;
(iv) removing ferrous hydroxide flocculate formed and adhering heavy metal hydroxides and dyes from the liquid of pH 6 to 7;
(v) adjusting the pH to within the range 7 to 9 and oxidising any ferrous ions remaining the ferric ions which precipitate as ferric hydroxide and
(vi) removing the ferric hydroxide with adhering heavy metal hydroxides from the liquid;
(vii) adjusting the pH of the liquid obtained to below 6.5, and
(viii) re-cycling the liquid back to the dyehouse.

The effluent is a pH below 6.5, generally between 4 and 5. Being effluent from a dyehouse, it will comprise water coloured by the dyes present in it. Such dyes may be chrome dyes and so chromium ions, which are heavy metal ions, will then be present in the water. It is necessary to remove such ions as the water is to be re-cycled. The water will also contain surface active agents (which may be dye complexing retarders). Economic considerations dictate that such surface active agents preferably should be recovered for future use.

The effluent may also contain textile fibres and other solid matter which should be removed, eg by screening or filtration before carrying out the process of the invention. Thus, the effluent can be led to an effluent sump and then through a fibre removal filter. The resultant effluent passes to one or more ion exchange chambers where the surface active agents are removed by upflow ion exchange.

The ion-exchange resin to be used will depend on the surface active agents charge. For example an anionic (ie positively charged) surface active agent, such as a sulphonate castor oil can be removed by treatment with a weakly basic anion exchange resin, whereas a cationic (ie negatively charged) surface active agent can be removed with a weakly acidic cationic exchange resin. The ion exchange treatment is by upflow treatment, preferably with the area of exchange resin increasing in the direction of upflow. The upper diameter of the resin column is such that the upward liquid velocity does not exceed the strokes velocity resin, resulting in the resin beads falling back into the exchange resin bed. Such a partial fluidisation of the bed allows free passage of suspended material through the bed without excessive pressure increase or decrease in effluent flow rate.

Any suitable ion-exchange resin can be used. The ion-exchange resin may be selected from an "Amberlite" ion exchange resin, sold by Messrs Rohm and Haas. The word "Amberlite" is a Registered Trade Mark. Strongly acidic cation exchange resins have a sulfonic acid functionality. Weakly basic cation exchange resins have carboxylic functionality. Strongly basic anion exchange resins have quaternary ammonium functionality, whereas weakly basic anion exchange resins have polyamine functionality. Amberlite DP-1 is an example of a weak acid ion exchange resin, and Amberlite IR-120 is a strong acid ion exchange resin. Amberlite IRA-93 is an example of a weakly basic anionic cation exchange resin. Reference may be had to Technical Bulletins and Summary Bulletins on Amberlite Resins published by Rohm and Haas Company of Philadelphia, Pa.

The iron ions are added by electrolysis using an iron electrode, which is consumed during the electrolysis eg an electrode of iron or scrap iron as the effluent is to be recycled. The surface active agents have been removed, and the iron ions pass into solution and precipitate as iron hydroxides. Ferrous hydroxide precipitates out as a flocculant solid, together with other heavy metals which were in solution, eg chromium (as $Cr^{3+}$) copper, nickel and cobalt. The content of ferrous ions present depends on the oxidation characteristics of the effluent being treated. If oxidising agents are present in the effluent, some ferrous ions may be oxidised immediately to ferric ions. The solubility of ferrous hydroxide is about 5 to 15 parts per million, so some iron ions remain in solution.

If the pH is not already in the range of 6 to 7, it can be adjusted to within that range to give an optimum precipitation conditions for ferric hydroxide floc. The actual pH, depends generally on the zeta potential of the colouring material. For example, if the residual dye is anionic, a positive zeta potential on the ferric hydroxide flocculate would be desirable, and vice versa. Thus, the pH may be less than 6.6 for treating an aqueous liquid containing an anionic residual dye. Similarly the pH can be adjusted to the optimum value for adsorbing colouring materials which have a zero zeta potential, or which form complexes with ferrous or ferric ions, or their hydroxides.

The ferrous hydroxide and ferric hydroxide flocculate containing the heavy metal ions and the dye, adsorbed, absorbed or complexed therewith may be separated by thickening, clarification, flotation, centrifuging, filtration, or the like, or a combination of two or more such steps. As the solubility of ferrous hydroxide is in the region of 5 to 15 mg/liter, it is necessary to oxidise this soluble iron to the ferric state, eg with oxygen, hydrogen peroxide, air or ozone ensuring precipitation of soluble iron ions as insoluble ferric hydroxide. The pH is then adjusted to between 7 and 9. During this oxidation and pH adjustment the last traces of colour and heavy metal ions adhere to the ferric hydroxide floc and are removed.

The treated effluent may then be passed through a colour and heavy metal ions detection apparatus or system, eg a spectrophotometer, photometer, turbidity meter, or the like, or examined by eye. The treated effluent may then be recycled to be treated again with iron, or accepted for further use.

The pH of the effluent is adjusted to a pH of below 6.5 to make it suitable for use in a dyehouse. The ion exchange resins used to remove surface active agents may be regenerated in known manner to yield surface active agents which can be recycled to the dyehouse. Buffer solutions (eg based on acetic acid, sodium acetate and sodium hydroxide) may be used for pH adjustment. The ferrous hydroxide and ferric hydroxide may be used as landfill, or disposed of as seen fit.

DETAILED DESCRIPTION OF THE INVENTION

The invention is illustrated by reference to the following non-limiting Example, read with the flowsheet illustrated in the accompanying drawing.

EXAMPLE

The effluent was from a dyehouse and contained;

Acetic Acid
Sodium acetate
Surface active agent (sulphonated castor oil)
Antifoamer
dyes including chromium dyes as well as other dyes which were not heavy metal dyes,
suspended matter such as fibres and synthetic starches.
The pH was 4.7

The fibres present was first removed by screening and then the surface active agent was removed by upflow ion exchange using a weakly basic anion exchange resin (Amberlite IRA 93).

The reactions which occurred were as follows:
Protonation of resin in acid solution.

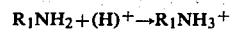

Dissociation of sulphonated castor oil

Ion exchange reaction (Extraction of sulphonate).

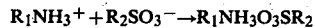

As a weak basic anion exchange resin was used, only the strong acids, such as sulphonates and sulphates were removed from the effluent. The anion exchange resin was treated from time to time to recover the surface active agent and to regenerate the anion exchange resin. Carboxylic anions such as $CH_3COO^-$ were not removed on passing the effluent through the resin but would be removed if a strongly basic anion exchange resin were used, resulting in more frequent resin regenerations.

Electrolysis of iron into the effluent under acid conditions (pH below 6.5) from an iron electrode was then effected using a Standard D.C. power supply and applying Farraday's Laws of Electrolysis to determine the amount of iron ions released into the effluent.

During electrolysis of iron ferrous ions were transferred into the effluent from the iron electrode. When hexavalent chromium ions from chrome dyes or from chromium salts are present in the effluent, the hexavalent chromium ($Cr^{6+}$) and trivalent chromium ($Cr^{3+}$) are reduced to divalent chromium ions ($Cr^{2+}$). After electrolysis, pH adjustment to pH 6-7 was effected with alkali. A ferrous hydroxide flocculate was formed as well as insoluble divalent chromous hydroxide $Cr(OH)_2$, and hydroxides of other heavy metal ions, eg hydroxides of Cu, Ni, Co etc. Since divalent chromium hydroxide is insoluble whereas trivalent chromium hydroxide is unstable, trivalent and hexavalent chromium ions remain in solution. The heavy metal hydroxides as well as dyes and suspended matter adsorbed therewith was flocculated by the ferrous hydroxide, and removed as a sludge.

Oxidation of the remaining soluble ferrous ions to ferric hydroxide was carried out by adjusting the pH to within the range 7-9 with alkali and adding hydrogen peroxide until all traces of colour had been destroyed.

Sludge thickening was achieved using a clarifier, and ferric hydroxide fines were removed from the overflow by candle filters and rotary vacuum filters using diatomaceous earth to ensure that no traces of $Fe(OH)_3$ remain in the treated effluent, since Fe is a heavy metal ion and can react with certain dyes.

Colour detection was then carried out using a Beckman spectrophotometer. Heavy metal ion detection was determined by colour complex formation or by atomic absorption spectrophotometer. Once the colour was acceptable, the pH was adjusted to 4,7 with acetic acid, and the treated liquid was supplied to the dyehouse and reused (after adding about 20% water since some water had been lost on fibre removal and in thickening sludge drying beds). Rejected effluent was re-supplied to the electrolysis step. By recycling the treated liquid, loss of useful soluble substances and outside contamination were avoided.

I claim:

1. A process for the purification of aqueous acid effluent from a dyehouse and containing dissolved solids without substantially building up the total dissolved solids content in the effluent, said effluent being effluent of pH less than 6.5 from a dying process and which is contaminated with at least one dye, heavy metal ions and surface active agents, but substantially free from fibres, which process comprises the steps of (i) subjecting the acid effluent to upflow ion-exchange to remove surface active agents present;

(ii) thereafter passing the treated effluent to an electrolysis bath containing iron electrode which introduces sufficient ferrous ions from the iron electrode into the treated effluent to form a ferrous hydroxide flocculate by passing an electric current between said iron electrode through the effluent thereby the iron electrode is consumed during the electrolysis;

(iii) removing said formed ferrous hydroxide flocculate and adhering heavy metal hyroxides and dyes from the effluent at a pH of 6 to 7.;

(iv) adjusting the pH of said effluent to within the range 7 to 9 and causing oxidation of any ferrous ions remaining to ferric ions by means of at least one oxidizing agent selected from air, any oxidizing agent present in the effluent and added oxidizing agents to precipitate the ferrous hydroxide as ferric hydroxide; and (v) removing the precipitated ferric hydroxide with adhering heavy metal hydroxides to leave a treated effluent;

(vi) subjecting the treated effluent to an examination for acceptable color and determination of the heavy metal content;

(vii) recycling any treated effluent which is of unnacceptable color or which has an unacceptably high heavy metal content to the electrolysis step (ii), and repeating steps (ii) to (vi), thereby increasing the total content of ferrous ions introduced from the iron electrode into the effluent, the actual content of ferrous ions being dependent on the content of heavy metal ions in the effluent;

(viii) adjusting the pH of the treated effluent from step (vi) which has an acceptable color and an acceptably low heavy metal content to a pH below 6.5 and (ix) recycling the treated effluent from step (viii) back to the dyehose.

2. A process according to claim 1, wherein the ion-exchange treatment comprises treatment with a weakly acid ion-exchange resin selectively to remove any anionic surface active agents present.

3. A process according to claim 2, wherein the anionic surface active agent is removed from the ion-exchange resin and recycled to the dyehouse.

4. A process according to claim 1, wherein the ion-exchange treatment comprises treatment with a weakly basic ion-exchange resin selectively to remove any cationic surface active agents present.

5. A process according to claim 4, wherein the cationic surface active agent is removed from the ion-exchange resin and recycled to the dyehouse.

6. A process according to claim 1, wherein the ion-exchange treatment comprisies successive treatment with a weakly acid ion-exchange resin and a weakly basic ion-exchange resin.

7. A process according to claim 6, wherein anionic surface active agent adsorbed on the weakly acid ion exchange resin is removed therefrom and recycled to to dyehouse, and wherein cationic surface active agent adsorbed on the weakly basic ion exchange resin is removed therefrom and recycled to the dyehouse.

* * * * *

UNITED STATES PATENT AND TRADEMARK OFFICE
CERTIFICATE OF CORRECTION

PATENT NO. : 4163716
DATED : August 7, 1979
INVENTOR(S) : Roy H. Turnbull

It is certified that error appears in the above-identified patent and that said Letters Patent are hereby corrected as shown below:

In the Abstract:

Line 6, "ca-h" should read --cath--

In the Summary of the Invention:

Column 2, line 2, "the" should read --to--

In the Claims:

Column 6, line 14, "dyehose" should read --dyehouse--

Signed and Sealed this

Twenty-second Day of January 1980

[SEAL]

Attest:

SIDNEY A. DIAMOND

Attesting Officer

Commissioner of Patents and Trademarks